United States Patent [19]

Cave

[11] Patent Number: 6,075,843
[45] Date of Patent: *Jun. 13, 2000

[54] USER DEVICE-INDEPENDENT TRANSACTION MODEL

[75] Inventor: Ellis K. Cave, Garland, Tex.

[73] Assignee: InterVoice Limited Partnership, Reno, Nev.

[*] Notice: This patent issued on a continued prosecution application filed under 37 CFR 1.53(d), and is subject to the twenty year patent term provisions of 35 U.S.C. 154(a)(2).

[21] Appl. No.: 08/761,004

[22] Filed: Dec. 5, 1996

[51] Int. Cl.[7] .............................. H04M 1/64; H04M 11/80
[52] U.S. Cl. ................................ 379/88.13; 379/88.16; 379/88.18; 379/88.22; 379/93.15
[58] Field of Search ................................. 379/67, 88, 89, 379/88.01, 88.08, 83.13–88.17, 88.22, 88.25, 93.01, 93.15, 93.24, 100.13, 210, 67.1, 88.04, 88.18

[56] References Cited

U.S. PATENT DOCUMENTS

| | | | |
|---|---|---|---|
| 4,837,798 | 6/1989 | Cohen et al. | 379/88 |
| 5,197,062 | 3/1993 | Picklesimer | 370/13 |
| 5,327,486 | 7/1994 | Wolff et al. | 379/96 |
| 5,379,366 | 1/1995 | Noyes | 395/54 |
| 5,406,557 | 4/1995 | Baudoin | 370/61 |
| 5,479,411 | 12/1995 | Klein | 370/110.1 |
| 5,583,920 | 12/1996 | Wheeler, Jr. | 379/88 |
| 5,608,786 | 3/1997 | Gordon | 379/100 |
| 5,610,910 | 3/1997 | Focsaneanu et al. | 370/60.1 |
| 5,742,905 | 4/1998 | Pepe et al. | 455/461 |

*Primary Examiner*—Krista Zele
*Assistant Examiner*—Allan Hoosain
*Attorney, Agent, or Firm*—Fulbright & Jaworski L.L.P.

[57] ABSTRACT

A transaction model compartmentalizing generic ("user device-independent") information into transactions between a system and a user. Navigation of a series of these transactions enables the system and the user to exchange information in an organized and logical fashion. Each transaction is represented by a user device-independent transaction template which, when executed, enables a predefined exchange of information between the system and the user in user device-independent form. System functions, such as decision branch control, calculation steps and/or data retrieval are interlaced as required between transaction templates and process information so as to further facilitate the information exchange between the system and user in a user device-independent environment. User device templates are then associated with each transaction template. By scripting and conditioning the device-independent information exchange in the transaction template to take place in various device-dependent forms (i.e. compatible with the particular formats and/or media supported by the user's terminal type), these user device templates enable multiple diverse types of user terminal devices to exchange information via the same transaction template.

42 Claims, 4 Drawing Sheets

USER DEVICE-INDEPENDENT TRANSACTION MODEL

RELATED REFERENCES

Reference is hereby made to commonly assigned and co-pending U.S. patent application SYSTEM AND METHOD FOR IDENTIFYING REMOTE COMMUNICATIONS FORMATS, Serial No. 08/720,559, filed Sep. 30, 1996, the disclosure of which application is incorporated herein by reference.

TECHNICAL FIELD OF THE INVENTION

This invention relates generally to systems and methods for structuring information, and more particularly to a transaction model that enables applications programmers to design information flows between a user and a system in a user device-independent environment, and then customize the user's interaction with the information flow according to the communications format and/or media needs of the user's particular terminal device.

BACKGROUND OF THE INVENTION

The related disclosures incorporated herein by reference teach the advantages of allocating resources within a communications system to facilitate access to generic information by users whose types of terminals and interconnecting links have diverse requirements as to format and/or medium. In accordance with these references, resources are allocated to make stored information format- and/or medium-compatible with a wide variety of remote terminal types and interconnecting links. This brings about resource efficiency, obviating the need to have many redundant resources, as is usually encountered in the art, wherein each individual resource might be compatible with only one communication format and/or medium.

Figure 1:
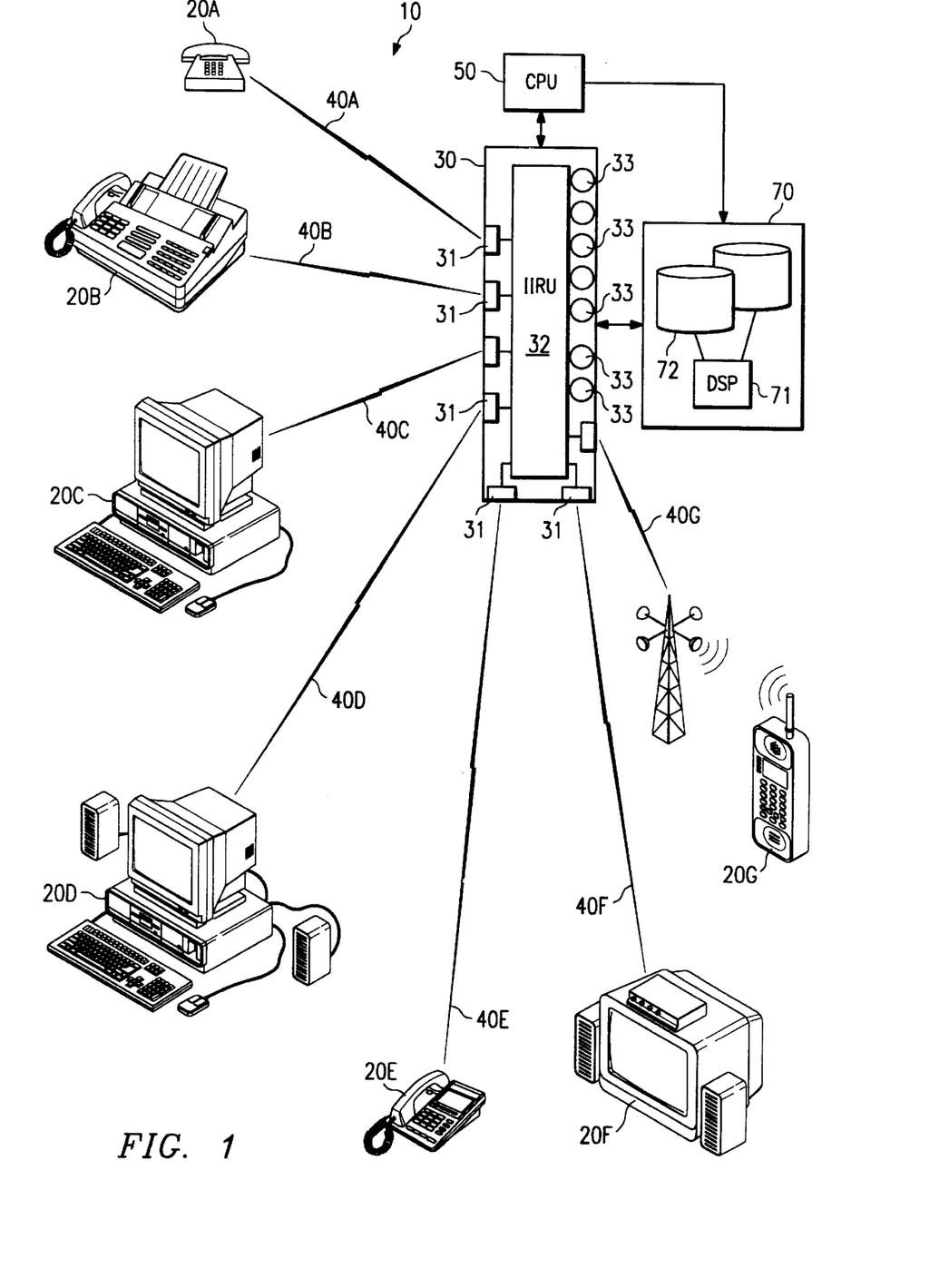
FIG. 1 is a diagram imported from the above-referenced U.S. patent application SYSTEM AND METHOD FOR IDENTIFING REMOTE COMMUNICATIONS FORMATS, in which architecture is depicted illustrating an environment in which the present invention may be enabled.

An example of an environment enabling such user device-independent access to generic information is disclosed in the above referenced U.S. patent application SYSTEM AND METHOD FOR IDENTIFYING REMOTE COMMUNICATIONS FORMATS. This disclosure is abstracted herein for illustrative background purposes. With reference to FIG. 1, it will be seen that a plurality of terminal devices 20A through 20G may be connected to Interactive Information Response Unit ("IIRU") 30 via a plurality of interconnecting links 40A through 40G. Exemplary terminal devices illustrated on FIG. 1 are: conventional telephone (20A), fax machine (20B), standard desktop computer (20C), multimedia desktop computer (20D), enhanced telephone with display (20E), home entertainment center (20F), and cellular/wireless telephone (20G). Other terminal devices not illustrated may include a personal communications system (PCS), a hearing impaired terminal, or a pager.

Similarly, it will be understood that interconnecting links 40A through 40G may be one of several types of link of varying speed and bandwidth, and may be independent of the type of terminal device to which they connect. Examples of such types of interconnecting links include POTS lines, ISDN lines, T1 lines, fiber optic lines, and, as illustrated in item 40G, a partial wireless link. Modems, data compression resources and other data conversion devices operating in terminal devices 20A through 20G, where applicable, may also affect the speed and bandwidth of a particular interconnecting link The information to be exchanged with terminal devices 20A through 20G is advantageously stored in generic form on information resource 70, which in turn is in data communication with IIRU 30. IIRU 30 comprises ports 31 through which terminal devices 20A through 20G connect to IIRU 30. Switch 32 within IIRU 30 enables resources 33 to be allocated to terminal devices through ports 31 so as to enable terminal devices 20A through 20G to communicate with information resource 70 regardless of individual terminal type format or medium requirements.

Once the appropriate resources 33 have been allocated, said resources 33 then adapt generic information available from information resource 70 into formats compatible with pending communications, so that terminal devices 20A through 20G may exchange information with information resource 70.

The architecture described on FIG. 1 thus provides users with more format- and/or medium-compatible access to generic information. There is now a need for a transaction model that will organize and deliver the generic information to users with diverse types of terminal devices.

For example, in a modern day environment of multimedia communications, it would naturally be advantageous to be able to deliver the information in all the media supported by the user's terminal type and/or deliverable through the interconnecting link. In the past, however, a programmer has typically had to develop multiple and entirely separate (although analogous) applications programs, each enabling a similar sequence of transactions between the user and a body of generic information, but each tailored to complete by different hardware specifications, or to a different set of media supported by a particular type of terminal. As a result, the programmer must write a separate application to support each type of environment encountered. A given transaction might thus have to be coded repeatedly, once or more in each separate application, each time in a different format so as to be media-compatible with the environment for which the application is being written. For example, a programmer seeking to communicate a simple bank balance from a database of generic information might have to write one application for communication with a telephone in which the information is in digitized sound ("WAV") format, a second program for communication with a PC over a slow modem line in which the information is in ASCII format, a third program for faster PC communication with the information in multimedia format (including graphics and sound), a fourth program for communication with a fax machine in fax format, a fifth program for communication with a hearing impaired device, and so on.

It will be readily appreciated that when applied to information structure in which numerous information exchanges, or "transactions", between user and system are integrated, the above-described programming methodology leads to considerable redundancy. A need therefore exists for a user device-independent transaction model that will allow programmers to design flows of information independent of the user device or the media in which the information is to be delivered. Once the basic transaction flow is established in user device-independent form, it would then be advantageous to be able to deliver the information in device-dependent form, i.e. the format and/or media required by the user's terminal device.

SUMMARY OF THE INVENTION

The present invention first compartmentalizes an information exchange between a system and a user into transactions whose interrelation is predefined to allow the user to navigate the information logically and effectively. In each transaction, the system typically presents information at least once to the user and then anticipates a response from the user. The user's response may or may not terminate the transaction, depending on the nature of the transaction and the response. A terminating condition eventually occurs, however, and may include an orchestrated termination (such as the end of playing a piece of music), or a user's particular response, or a time-out. The occurrence of the terminating condition concludes the transaction and enables the next transaction. The system may also perform user device-independent functions, such as branch control logic calculations or data retrieval, between consecutive transactions.

To enable this system/user interaction, a user device-independent transaction model is provided wherein each transaction is represented by a corresponding user device-independent transaction template. The transaction template enables, in user device-independent form, the exchange of information between the system and user represented by the transaction.

Each transaction template is also associated with one or more user device templates. Each user device template then adapts the transaction template's information exchange according to a specific user device-dependent "scene" and "script" that is compatible with the media and/or format requirements of the user's terminal device and/or interconnecting link. For example, a first user device template may play audible speech output in response to DTMF input (such as would be appropriate if the user's terminal device were a telephone). A second user device template may play text, audio, graphics and video in response to keyboard or mouse input (such as would be appropriate if the user's device were a multimedia computer.) In this way, it will be seen that different user device templates may be associated at different times with the same transaction template. This allows the user device-independent information exchange embodied by a series of transaction templates to be enabled for various users regardless of the media and/or format requirements of the user's terminal device or interconnecting link.

The foregoing summary will now be explained in greater detail. A transaction template enables the information exchange in each transaction in the transaction model. This transaction template defines and enables, in user device-independent form, a predefined interaction between system and user. In a remote banking system example, system/user interactions typically defined and enabled by a transaction template might include: (1) welcoming the user to the system; (2) soliciting selections from a menu; (3) soliciting authorizations through, for example, PIN numbers or passwords; (4) performing calculations to give results based on user-provided parameters; or (5) presenting pre-stored data responsive to the user's request. It will be understood, however, that the present invention is not limited to these interaction types, or even this remote banking application, and many more types of interaction within all kinds of system/user applications are possible.

Input variables are values that must, where required, be provided to a transaction template before the transaction template can be executed. The transaction template may or may not require input variables, depending on the type of system/user interaction enabled by the particular transaction template. For example, in a transaction model enabling remote banking, a transaction template in which the system displays the user's bank balance will require the system to provide input variables that include a number representing the amount of money in the user's account at that time. In contrast, a transaction template in which the system merely welcomes the user to a new series of processing options will likely not require input variables.

Output variables, where generated, are values that are generated as a result of a transaction template being executed. The transaction template may or may not generate output variables, again depending on the type of system/user interaction enabled by the particular transaction template. Again, using the remote banking example, any transaction template in which the system receives user selections or other information input by the user will generate output variables representing the user's information. In contrast, in cases where a transaction template causes the system to interact with the user without user input, such as by merely playing a video clip, or by merely reciting audible or written instructions, such transaction templates will likely not generate output variables.

Often, output variables from one transaction template may form input variables for the next, or a subsequent transaction template. In the case where output variables include a user's selection from a menu, the value of that output variable will normally be input to a conditional control construct, the output of which identifies the next transaction template to be executed. Alternatively, in cases where output variables include data supplied by the user (such as data to be stored or parameters to go into a calculation), such output variables will normally be passed to data storage or system processing devices as required by the transaction flow.

Such system processing is performed in the present invention by system functions. System functions are interlaced with transaction templates to control the execution sequence thereof, or to process information as required between successive transactions. For example, in a control setting, system functions may test the value of an output variable if it is expected to contain a user's menu selection. Through conventional control flow constructs, such system functions determine the next transaction template to be executed in accordance with the user's selection (i.e. the value of the output variable). Alternatively, system functions may adapt output variables in combination with previously stored information, or write to and/or read from data storage, or perform calculations. It will further be understood that the outcomes of system functions may also generate input variables for subsequent transaction templates.

It will be appreciated that as so far described, the transaction templates and system functions of the present invention process information in user device-independent form. To enable communication with the user in device-dependent form, each transaction template also provides one or more user device templates. These user-device templates script and condition the transaction template's information exchange to be device-dependent, i.e. format- and media-compatible with various types of user terminal devices. Each user device template thus defines a "scene" and "script" characterizing the manner in which a particular transaction's information exchange will take place in particular media and/or formats that are compatible with a user's terminal device. In this way, users with all kinds of various terminal devices, characterized by diverse information formats and/or media requirements, may access information through the same transaction template structure.

Accordingly, returning again to the remote banking system example, an exemplary transaction template may be disposed to present an account balance to the user along with a solicitation for instructions as to the next step. At the transaction template level, a number representing the user's account balance will be an input variable, and the user's selection as to what to do next will be an output variable. In other words, the transaction template may be described simply as:

| TRANSACTION TEMPLATE N | | |
|---|---|---|
| Input Variable | = | [account balance] |
| Output Variable | = | [selection 1] |

Let it now be assumed that the user is communicating with a standard voice telephone with DTMF dialing capability. An appropriate user device template is associated with the foregoing transaction template, with the following "scene" and "script":

| TELEPHONE USER DEVICE TEMPLATE FOR TRANSACTION TEMPLATE N |
|---|
| Play audio file 1 |
| Play input variable [account balance] in audio format |
| Play audio file 2 |
| Receive DTMF tone and convert to output variable [selection 1] |

Execution of the transaction template causes the "script" in the associated user device template to commence. Audio file 1 is advantageously a digitized speech file saying "your account balance is." Playing the account balance input variable in audio form allows the user to hear the balance figure. Audio file 2 is a second digitized speech file saying, for example, "to repeat, press 1; to go back to the main menu, press 2; to exit the system, press 3." The "script" is then disposed to expect the user's response in DTMF format, which is satisfied when the user presses a "1", "2", or "3" DTMF button on the telephone. The system interprets this user response to create the corresponding output variable [selection 1], and the information exchange in the transaction is now complete. In a typical application, a new transaction template then executes according to the value of output variable [selection 1], thereby obeying the user's selection.

Compare this now to where, instead of a telephone, the user's terminal device is a multimedia PC supporting sound, graphics and video. Again, the same transaction template is executed, wherein a number representing the user's balance is an input variable, and the user's selection as to what to do next is an output variable. Again, the transaction template may be described simply as:

| TRANSACTION TEMPLATE N | | |
|---|---|---|
| Input Variable | = | [account balance] |
| Output Variable | = | [selection 1] |

In this case, however, a user device template is associated with the transaction template that enables the information to be exchanged in formats and/or media supported by and compatible with the user's multimedia PC. Now, the user device template may typically be expected to comprise a "scene" and "script" such as:

| MULTIMEDIA PC USER DEVICE TEMPLATE FOR TRANSACTION TEMPLATE N |
|---|
| Play background music file 1 |
| Play graphic files (1 . . . n) at screen positions (a . . . n, b . . . n) |
| Play video file 1 at screen position (u,v) |
| Write text file 1 at screen position (x,y) |
| Write input variable [account balance] in text format at screen position (w,z) |
| Write text file 3 at screen position (s,t) |
| Play audio file 1 |
| Play input variable [account balance] in audio format |
| Play audio file 3 |
| Receive keyboard stoke and convert to output variable [selection 1] OR |
| Receive mouse click on screen zones p, q, or r and convert to output variable [selection 1]. |

Again, execution of the transaction template causes the "script" in the associated user device template to commence. Background music file 1 is advantageously a MIDI file containing suitable background music for the user to listen to while reading his or her account balance and selecting the next action. Graphic files (1 . . . n) are images, photographs or designs that make the screen pleasant and interesting to look at. Graphic files may also define screen zones for subsequent mouse clicks. Video file 1 is a video clip appropriate for this transaction, such as a bank employee looking at the user and pointing to an account balance statement. Text file 1 is text saying "Your account balance is:." Audio file 1 is advantageously the same file as was used in the previous "script" in the telephone example, comprising a digitized speech (WAV) file saying "your account balance is."

Input variable [account balance] is used twice in different formats (and media). It is first converted to text and written to screen to appear logically with text file 1. Thus, the user can see the account balance. Also, input variable [account balance] is played in digitized speech following audio file 1, so that the user can contemporaneously hear the account balance.

Text file 3 is the text which, when written to screen, solicits the next action. It may say, for example, "to go back to the main menu, press B on your keyboard or click on [back to main menu], to exit the system, press X on your keyboard or click on [exit]". It will be noted that in comparison to the previous example of a telephone, in which the option to repeat the account balance was also necessary by virtue of the all-audio format, text file 3 advantageously does not require this option because the account balance is displayed on the screen until the user is done with the transaction.

Audio file 3 is a digitized speech file which, when played, speaks the instructions set forth in text file 3 to solicit the user's next desired step. The system then expects input from the user in either keyboard format or mouse click format, which, when received, according to the particular keyboard stroke received or screen zone clicked, determines the value of output variable [selection 1]. As with the telephone example, the value of output variable [selection 1] then advantageously determines the next transaction template to be executed, corresponding with the user's particular selection.

In describing the invention above, it will be appreciated that different user device templates may share common media object files, such as background music file 1 or audio file 1, advantageously by "pointing" to them as stored on a centrally available mass storage device. Alternatively, the media object files may be included in the user device templates, along with the "scene" and "script."

It will thus be understood that the present invention discloses a user device-independent transaction model that enables programming of information exchanges in device-independent form, without regard to the format and/or media in which the user's terminal device may be communicating. This is achieved by organizing a series of interconnected transaction templates in which information is exchanged in device-independent form. User device templates are then associated with transaction templates, in which the information exchanges are presented to the user according to a "scene" and "script" in device-dependent form. Further, system functions in device-independent form, such as control flow constructs, calculations or information retrieval, may be interwoven between transaction templates to process information to be exchanged in a controlled sequence of transaction templates.

It will be understood that the appropriate user device template (to enable communication in the correct formats and/or media) may be selected according to above-referenced U.S. patent application SYSTEM AND METHOD FOR IDENTIFYING REMOTE COMMUNICATIONS FORMATS, which teaches a system and method for recognizing the format and/or media of a remote user's communication for the purpose of assigning compatible resources thereto. Once the formats and/or media of the user's communication are recognized, it will be appreciated that, in accordance with the present invention, an appropriate user device template may then be associated with a particular transaction template.

It is therefore a technical advantage of the present invention to provide a user device-independent transaction model for enabling an exchange of information between a system and a user, where the transactional flow of information is independent of the formats and/or media required to communicate with the user's terminal device.

It is a further technical advantage of the present invention to make economic use of programming resources by obviating the need to create multiple, separate applications programs, each customized for a particular user communication format and/or medium. Under the transactional model of the present invention, users may exchange information with a system in an environment that is user device-independent. The same information resource may thus be accessed substantially universally by users having many different terminal device types. Further, by de-emphasizing format- or media-dependence in information flow, the present invention tends to simplify maintenance and updating of information, or adaptation of the manner in which transactions are interrelated.

It is a further technical advantage of the present information to further optimize programming resources by optionally making shared use of media object files such as graphic files, music clips, audible speech files, text files or video clips, The user device-dependent "script" and "scene" within user device templates of the present invention enables this sharing where required.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

For purposes of describing a preferred embodiment of the present invention, exemplary use is continued of a system in which a user is communicating with a financial institution such as a bank to get account balances, account statements, current loan rates, and so on. It will be understood, however, that the present invention may be enabled on any system in which users exchange information with an information resource.

According to the present invention, whether under the bank example or any other application, and as shown with respect to FIG. 1 described in the "Background" section above, the user is coupled to the system by means of any one of a variety of terminal types, such as a standard telephone, or a low-speed terminal supporting text communications only, or a high-speed multimedia PC. The user is using the terminal to exchange information with the system in a "session." It will be understood that this "session," as is standard in the art, is advantageously compartmentalized into a series of transactions between the system and the user within a pre-defined interrelated regime thereof.

Typically, a transaction will consist of the system playing some information to the user, usually (although not always) with the user expected to make a response. The user's response may include data supplied by the user to be stored by the system, and/or a choice, such as in a menu.

Alternatively, the transaction may simply present information unilaterally, with no response expected.

Eventually, however, the transaction will terminate, either because the user responds in a certain way, such as pressing the "#" button on a DTMF telephone, or hitting the "Enter" key on a computer keyboard, or clicking a mouse button on a designated screen zone, or because a predefined event occurred, such as a piece of music finished playing, or the system timed out. Such "terminators" or "termination conditions", as will be referred to herein, signal termination of the transaction to the system and enable further processing according to the type of terminator or termination condition received.

It will thus be appreciated that each transaction has a "scene" and "script" under whose constraints the information is exchanged in the transaction. The "scene" is the environment and context in which the system presents information to the user. In any given transaction, the details of the "scene" will vary according to the user's terminal device. For example, in a transaction soliciting a PIN from the user, background music and the designation of particular DTMF responses may be part of the "scene" for a user communicating by telephone. Alternatively, screen layout may be part of the "scene" for a computer user.

The "script" is the order in which events must occur to enable the exchange of information embodied by the transaction, and the actions that must be taken if certain events do in fact occur. Further, as demonstrated in the "Summary" section above, in any given transaction, the "script" will also be seen to vary widely according to the user's terminal device.

The present invention provides a transaction model to enable the system and user to exchange information in the transactional environment just described. Under the transaction model, each transaction is represented by a transaction template which, when executed, enables the information exchange embodied in the transaction. The transaction template enables this information exchange in user device-independent form. In doing so, the transaction template processes two identifiable types of user device-independent information: (1) input variables received by each transaction template prior to execution thereof, which generally comprise data to be processed in the transaction through interaction with the user; and (2) output variables generated by each transaction template upon termination thereof, which generally comprise user-provided control information (identifying the sequence of subsequent transaction templates to be executed) or data to be processed in the next or a subsequent transaction, or data to be stored or processed.

Figure 2A:
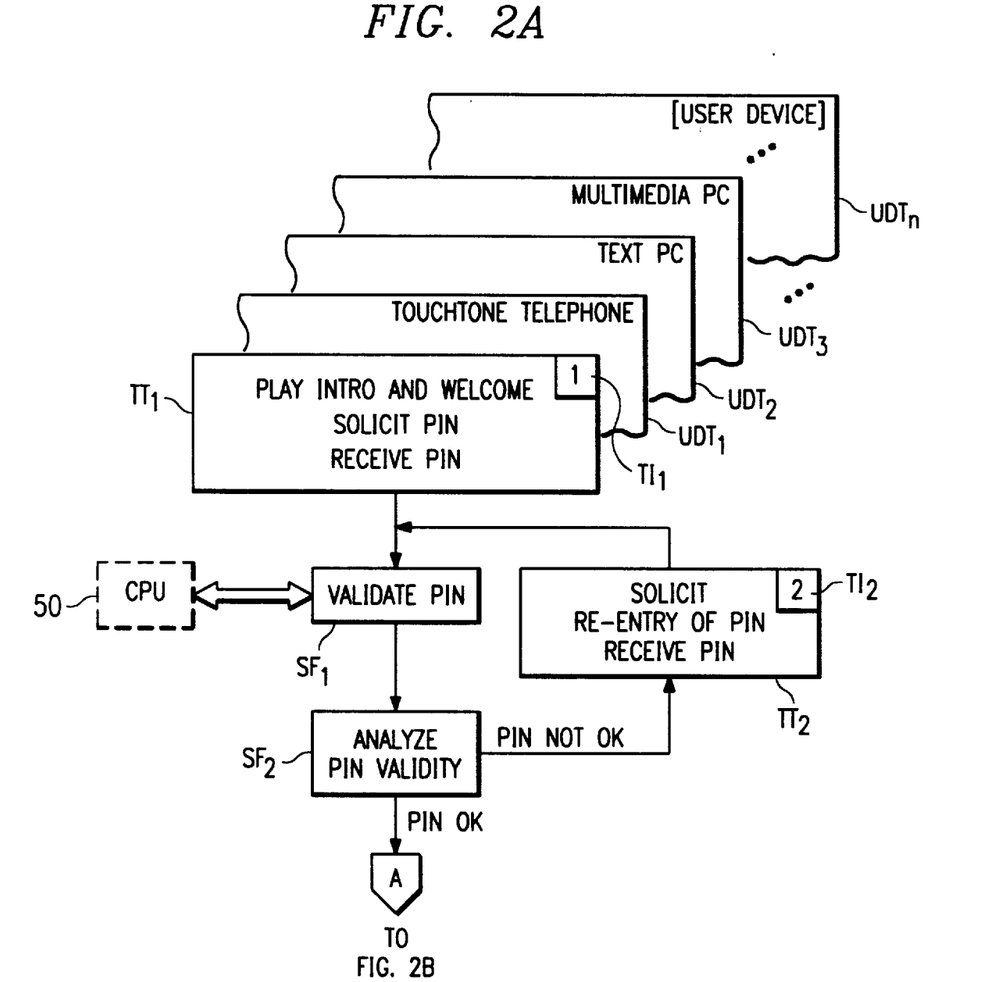
FIGS. 2A and 2B are a combination block diagram and flow chart illustrating an exemplary information flow enabled by the present invention.
Figure 2B:
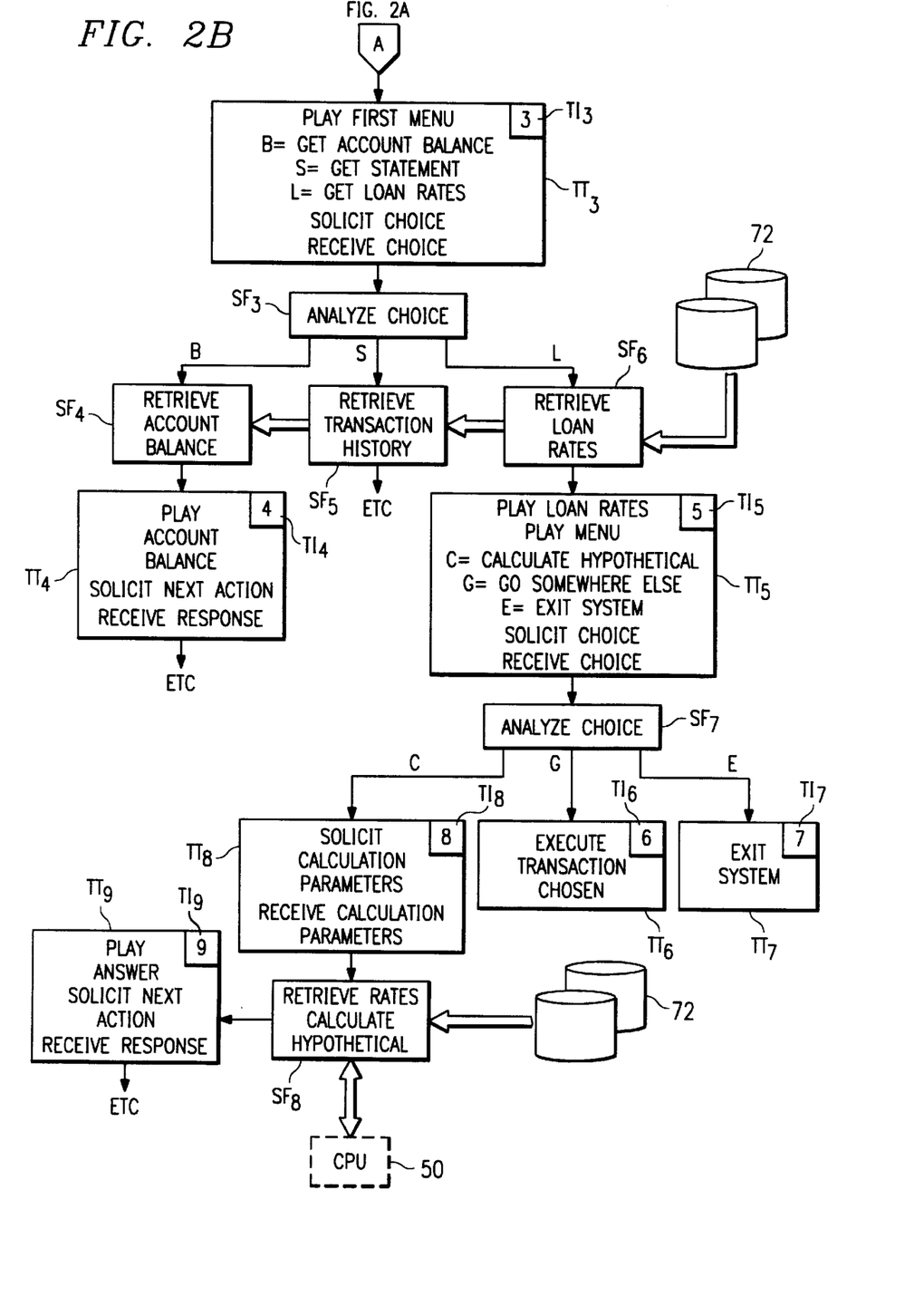

FIGS. 2A and 2B illustrate a preferred embodiment of the present invention, comprising a user device-independent transaction model including a series of interconnected transaction templates $TT_1$ through $TT_9$. Each such transaction template $TT_1$ through $TT_9$ defines a system/user information exchange (a "transaction"), as described above. Although nine such templates are illustrated in FIGS. 2A and 2B, it will be appreciated that in accordance with the present invention, an entire transaction model may comprise n such transaction templates $TT_1$ through $TT_n$, representative of n transactions in a predefined regime thereof. Further, although the flow chart of FIGS. 2A and 2B again make exemplary use of a user making inquiries of a bank, it will be appreciated that the present invention will apply analogously to any exchange of information between a user and an information resource.

Turning to FIG. 2A, transaction template $TT_1$ is illustrated with user device templates $UDT_1$ through $UDT_n$ associated therewith. Although FIG. 2A shows user device templates $UDT_1$ through $UDT_n$ associated only with transaction template $TT_1$, it will be understood in FIGS. 2A and 2B that all transaction templates $TT_1$ through $TT_9$ have a predetermined number of user device templates associated therewith, but illustration thereof has been omitted for clarity. Detailed discussion of user device templates $UDT_1$ through $UDT_n$ will be set forth further below.

Further reference to FIGS. 2A and 2B also illustrates each transaction template $TT_1$ through $TT_9$ having a corresponding terminal identifier $TI_1$ through $TI_9$ associated therewith, shown in the top right hand corner of the transaction template block. In FIGS. 2A and 2B, the terminal identifier is a simple numeral, although it will be appreciated that any identifying label may be used.

Referring now to FIG. 2A, transaction template $TT_1$ represents a startup transaction, enabled upon connection of the user to the system. In transaction $TT_1$, the introduction and welcome to the system is played, and a PIN is solicited and received. In accordance with prior discussion regarding input and output variables, it will be understood that transaction template $TT_1$ has no input variables and generates a user-entered PIN as an output variable.

The system then enables system function $SF_1$, in which the PIN provided by the user as an output variable from transaction template $TT_1$ is validated for authority. This may be accomplished by means known in the art, such as by table lookup or by an algorithm on the characters comprising the PIN. As illustrated in FIG. 2A, this processing may be done with reference to CPU 50.

Following validation of the PIN in $SF_1$, a further system function $SF_2$ determines whether or not the PIN is authorized. If it is, processing continues to transaction template $TT_3$ as further described below.

If, on the other hand, the PIN is determined by $SF_2$ not to be authorized, then the system executes transaction template $TT_2$, in which reentry of the PIN is solicited and received. Transaction template $TT_2$ may optionally also receive the previously failed PIN as an input variable if the "script" for $TT_2$ requires playing back the failed PIN to the user. Alternatively, $TT_2$ may require no input variables if the "script" calls for the user to enter another PIN without seeing the last attempt.

Again, output variables for $TT_2$ will include the PIN number as reentered by the user. As before, this new number is validated by $SF_1$ and tested by $SF_2$. Repeated inability of the user to supply an authorized PIN may advantageously prompt the system to disconnect from the user (not shown). Alternatively, a time-out may be invoked, receipt of which termination condition by the system will also disconnect the user if no authorized PIN is received (also not illustrated).

It will be further appreciated that although FIG. 2A illustrates $SF_1$ and $SF_2$ as two separate system functions, a single system function combining the processing of $SF_1$ and $SF_2$ to validate PIN would also be in accordance with the present invention.

Turning now to FIG. 2B, upon receiving an authorized PIN, the system executes the transaction represented by transaction template $TT_3$. In this transaction, the system plays a first menu, in which the user is offered three choices: "B" to get an account balance, "S" to get a statement, or "L" to get current loan rates. Transaction template $TT_3$ solicits the user's choice and then terminates on receipt of said choice from the user. Again, although not shown, it will also be understood that a time-out may also work to terminate transaction template $TT_3$, after which time the system may either disconnect, or execute a transaction that prompts the user for a response, if no choice has yet been received.

It will be understood that to this point, the termination of each of the transactions represented by $TT_1$, $TT_2$ and $TT_3$ is enabled by receipt of a termination condition from the user. It will also be understood that to this point, each of the transactions represented by $TT_1$, $TT_2$ and $TT_3$ are also disposed to be terminated by a time-out termination condition. It will therefore be appreciated that since the alternative time-out termination condition is commonly available to all transactions represented by transaction templates $TT_1$ through $TT_9$, further discussion of this feature may be omitted.

It will also be understood that transaction template $TT_3$ will likely not require input variables, since it is executed automatically upon the system receiving an authorized PIN. The transaction template nonetheless creates an output variable that represents the user's selection ("B", "S" or "L"). The system first tests the value of that output variable in system function $SF_3$ and then continues processing by executing system functions and transaction templates according to the value of that output variable.

With continued reference to FIG. 2B, and according to the value of an output variable from $TT_3$ identified in $SF_3$, the system next performs a corresponding system function $SF_4$ through $SF_6$ before enabling the next transaction.

System functions $SF_4$ through $SF_6$ retrieve information from mass storage device 72 to fulfill the user's request as indicated by the output variable identified from transaction template $TT_3$. For choice "B", system function $SF_4$ retrieves the user's account balance. For choice "S", system function $SF_5$ retrieves a transaction history for the user. For choice "L", system function $SF_6$ retrieves current loan rates offered by the bank. It will be further understood that in enabling system function $SF_4$ and $SF_5$, the system may use the validated PIN number created as an output variable by transaction template $TT_1$ or $TT_2$ in order to identify the particular balance or transaction history to be retrieved. In contrast, it will be seen that $SF_6$ may use a system-generated date to retrieve current loan rates.

Once the appropriate system functions $SF_4$ through $SF_6$ have been performed, the system executes a transaction according to the output variable representing the user's choice in transaction template $TT_3$. For example, if the user selects "B", the system executes a transaction represented by transaction template $TT_4$. In this transaction, the user's account balance is played (according to the information previously retrieved in system function $SF_4$), and the user's next desired action is solicited. It will be seen that a number representing the account balance (as retrieved in $SF_4$) is an input variable for $TT_4$, and the user's selection creates an output variable. Processing continues according to the value of the output variable created, as tested and identified by further system functions.

On the other hand, if the user's selection in transaction template $TT_3$ is "S", the system executes a transaction template in which an account statement is presented (not shown). Again, data representing the account history are input variables to this transaction template, and the user's selection creates an output variable.

Alternatively again, if the user's selection in transaction template $TT_3$ is "L", the system executes the transaction represented by transaction template $TT_5$. In this transaction, the system plays the current loan rates retrieved in system function $SF_6$, and then plays a menu soliciting the user's desired next action. Data representing the current loan rates are input variables to transaction template $TT_5$, and the user's selection creates an output variable. In the menu of $TT_5$, the user can select "C" to calculate a hypothetical loan amortization schedule based on loan rates played in this transaction, or may choose "G" to "Go Somewhere Else" (i.e. execute a transaction elsewhere on the system, including re-executing transactions already processed at least once in this session), or "E" to exit the system and disconnect. Receipt of the user's selection represents a termination condition for transaction template $TT_5$, which, upon termination, generates an output variable whose value is the user's selection. System function $SF_7$ tests the value of the output variable and executes further processing in accordance with the identified value.

If the choice is "G", then system function $SF_7$ executes the appropriate transaction template $TT_6$. Alternatively, if the user chooses "E", then system function $SF_7$ causes the system to disconnect, as illustrated by transaction template $TT_7$ on FIG. 2B.

On the other hand, if the user chooses "C", system function $SF_7$ executes the transaction represented by transaction template $TT_8$. In this transaction, the system solicits input from the user with which to calculate a hypothetical loan amortization. Such information advantageously might include the principal amount, the rate selected and the repayment time period. It will be understood that output variables from transaction template $TT_8$ will include such user input.

These output variables are fed into system function $SF_8$, which calculates the loan amortization. The result is an input variable to transaction template $TT_9$, which displays the result and solicits the user's next desired action. As before, this user selection creates an output variable from $TT_9$. Processing continues according to the value of the output variable (i.e. the user's selection) as tested and identified by a further system function.

Although the transactions represented by transaction templates $TT_8$ and $TT_9$ have been described as separate transactions, it will also be understood that in accordance with the present invention, these transactions could also be represented by a single transaction with an interim calculation step represented by $SF_8$.

The foregoing description of the present invention with reference to FIGS. 2A and 2B has so far described a transaction model that is independent of the format and/or medium in which the user's terminal device is communicating with the system. For example, it will be understood that the transaction flow as described on FIGS. 2A and 2B may be enabled equally well by a telephone user listening to automated speech and responding with DTMF input, or by a computer user receiving information on a monitor and responding with input via keyboard or mouse. The information to be exchanged is clearly defined, and the information flow is filly enabled, even though the two users are communicating in different formats and media. Further, it will be understood that a computer user exchanging information according to FIGS. 2A and 2B may do so equally well whether the user's computer is a sophisticated multimedia PC, or a simple text-based terminal. Again, the information to be exchanged is not dependent on the user's computer's capabilities.

Figure 3:
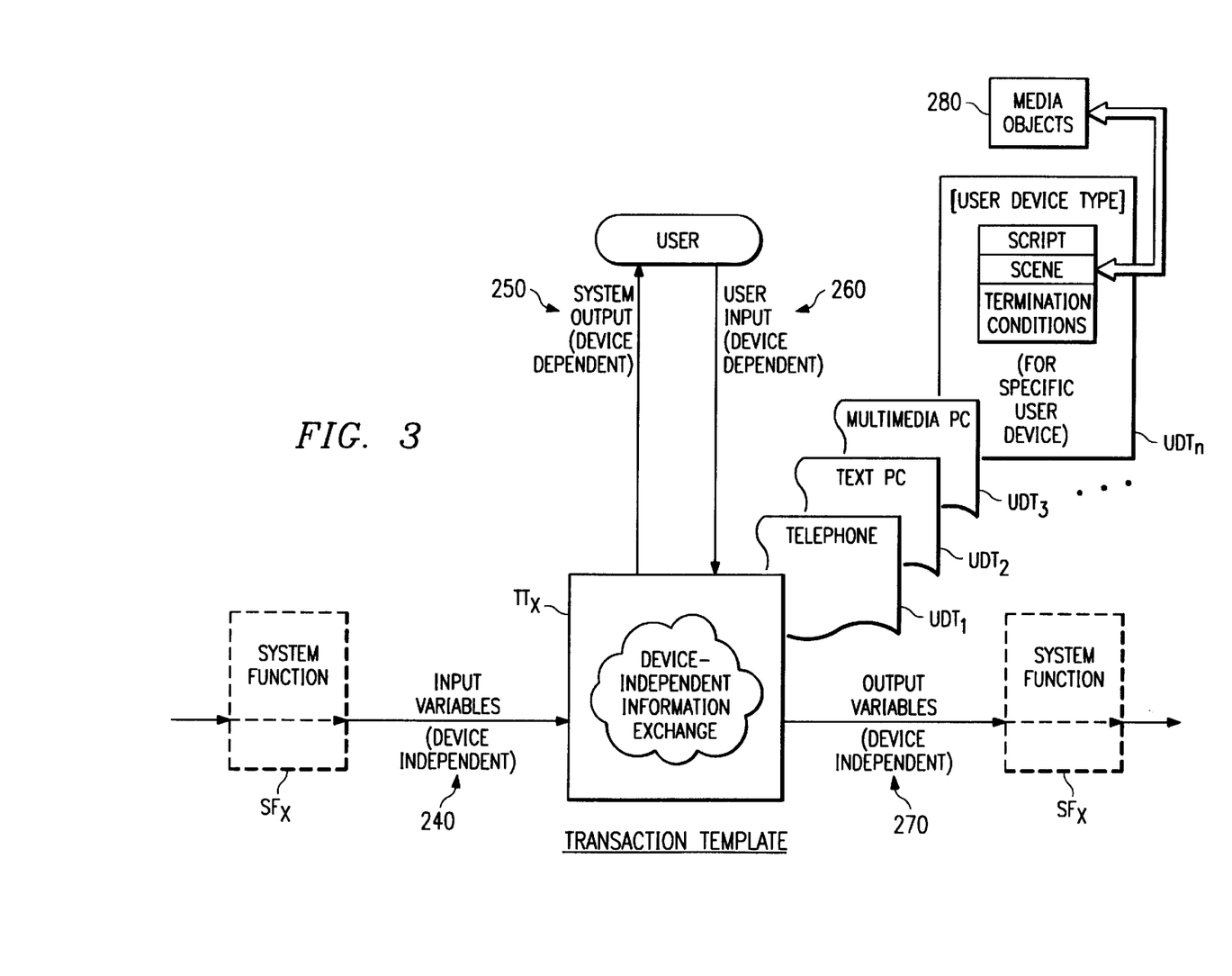
FIG. 3 is a data flow diagram illustrating the structure of the exchange of information (both user device-dependent and user device-independent) in a typical transaction according to the model of the present invention.

With reference now to FIG. 3, the means by which the present invention enables the above-described user device-independent transaction flow to be accessible to users communicating in various formats and/or media will now be discussed.

FIG. 3 illustrates a generic transaction template $TT_X$. It will be understood that in accordance with the present invention, all transaction templates $TT_1$ through $TT_9$ shown on FIGS. 2A and 2B have a common structure as represented by $TT_X$, and as shown on FIG. 3.

Transaction template $TT_X$ is illustrated on FIG. 3 in the form of a data flow diagram, and shows the flow of information with reference to the types of user device-independent information described above. Device-independent input variables 240 are optionally received by transaction template $TT_X$, which is then executed.

As noted above, input variables 240 may be created as a result of operation of a system function $SF_X$, whose optional operation on FIG. 3 is represented by its broken outline. Such system functions may include retrieving specific data from mass storage, and/or performing a calculation. Input variables may also be received directly as output variables from a preceding transaction template. Note, however, that not all transaction templates require input variables. In some transaction templates, such as playing a welcome or introduction, no input variables may be necessary.

When executed, transaction template $TT_X$ enables the device-independent information exchange in the system/user transaction represented thereby. As a result of completion of this exchange, device-independent output variables 270 may or may not be created. Where created, output variables may optionally feed system functions $SF_X$ for processing such as branch control, calculations or writing to mass storage. Alternatively, where created, output variables may include user selections/instructions as to the next transaction template $TT_X$ to be executed. Note, however, that not all transaction templates $TT_X$ may create output variables. For example, output variables would likely not be generated in a transaction in which music or video is played, and which then automatically terminates upon completion of the music or video.

As will be further seen on FIG. 3, in enabling the information exchange, transaction template sends system output 250 to a user and receives user input 260 from the user.

In order for system output 250 and user input 260, which are device-dependent, to be exchanged with transaction template $TT_X$, which is device-independent, each transaction template $TT_X$ also has associated therewith a predetermined number of user device templates $UDT_1$ through $UDT_n$. User device templates $UDT_1$ through $UDT_n$ define a user device-dependent "scene" and "script" for the information exchange in the transaction, and condition the user device-independent information processed during the execution of transaction template $TT_X$ to be format- and media-compatible with the user's terminal type. These scripting and conditioning functions also include identifying, for each user device template, the termination conditions that the system should expect to receive in order to terminate transaction template $TT_X$ and take further action.

For example, if the user is communicating over a standard telephone, this situation may first be identified and recognized by methods disclosed in the above-referenced U.S. application SYSTEM AND METHOD FOR IDENTIFYING REMOTE COMMUNICATONS FORMATS. Responsive to this identification, the system associates telephone user device template $UDT_1$ with transaction template $TT_X$. Telephone user device template $UDT_1$ first enables the information exchange represented by transaction template $TT_X$ according to a pre-defined "script" and "scene". This "script" and "scene" calls for audible speech output and DTMF input so as to be compatible with the user's telephone. $UDT_1$ then conditions system output 250 to the user to be formatted into automated speech format and conditions the system to receive user input 260 in DTMF format. $UDT_1$ further identifies termination conditions appropriate for a telephone user, such as, for example, the "#" button in DTMF. As noted above, the script in $UDT_1$ is advantageously executed with reference to separate media object files 280 shared with other user device templates. In another embodiment, however, multiple media object files may also be stored on each user device template, without cross-sharing.

Suppose now that if instead of a telephone, the system recognizes that the user is connected to the system with a high-capability multimedia PC. In this case the system will associate multimedia PC user device template $UDT_3$ with transaction template $TT_X$. Multimedia template $UDT_3$ first enables the information exchange in the transaction template $TT_X$ according to a pre-defined "scene" and "script" suitable for a multimedia PC user. Multimedia template $UDT_3$ then conditions system output 250 to be formatted into a variety of media as supported by the user's terminal. For example, system output 250 may be formatted into text, graphic, audio (WAV and/or MIDI), or even video format. Similarly, multimedia template $UDT_3$ conditions the system to expect user input 260 in keyboard, mouse, or even voice format from the user. Again, $UDT_3$ also identifies appropriate termination conditions for a multimedia PC user according to the script, such as, for example, particular keyboard strokes or mouse click zones.

Applying the foregoing to the bank system example, let it be assumed momentarily that transaction template $TT_X$ on FIG. 3 represents transaction template $TT_1$ on FIG. 1. When transaction template $TT_X$ is associated with telephone user device template $UDT_1$, the "script" will advantageously call for playing audible information and receiving DTMF responses. System output 250 will thus be conditioned to be purely in audio format, and may say something like: "Welcome to First Bank's Automated Teller. Please enter PIN identifier." Additionally, there may be music in the background. User input 260 will be conditioned to be expected in DTMF.

In contrast, when transaction template $TT_X$ is associated with multimedia template $UDT_3$, the "script" will call for including, for example, a picture of the bank on the screen, background music, a voice welcome followed by a spoken request to submit a PIN identifier, a video in one corner of the screen showing a bank employee opening the door for a customer and a text entry box in which the user may enter a PIN identifier. User input 260 will be conditioned to be expected in text (by keyboard) or by mouse click.

The information flow through transaction template $TT_X$ thus remains user device-independent, but user device templates $UDT_1$ through $UDT_n$ script and condition the information in transaction templates to be responsive to the communication needs of the user.

It will be further appreciated that where feasible, user device templates $UDT_1$ through $UDT_n$ may be shared between the various transaction templates $TT_X$ that comprise the overall transaction model.

It will also be understood that in accordance with the present invention, as a user's session with a system progresses, user device templates $UDT_1$ through $UDT_n$ associated with transaction templates $TT_X$ may change over time as the user navigates a series of transactions. For example, returning to the bank balance example as described above with reference to FIGS. 2A and 2B, suppose that a user is connected to the system by telephone. The user would probably not wish to receive a bank statement or a loan amortization schedule in audio format over the telephone. Instead, therefore, the "scene" and "script" for these bank statement and loan schedule transactions advantageously condition the system, when telephone user device template $UDT_1$ is active, to execute a further transaction in which a fax number is solicited from the user. The system may then send the bank statement or the loan schedule to this fax number. In this situation, it will be readily appreciated that the transaction following the receipt of a responsive fax number will also have a fax user device template associated therewith in which system output 250 is conditioned to be dispensed in fax format.

As noted above, in a preferred embodiment, media objects 280 comprise separate files that may be shared by multiple user device templates. In this way, further optimization of programming resources may be realized. When media objects 280 are separate and shared, the "scene" and "script" in user device templates advantageously "point" to the media object files as required. It will be understood, however, that in another embodiment, media objects may also be "carried" as required on appropriate user device templates.

It should be further noted that in accordance with the present invention, it is not necessary for scripts user device templates to "carry", or "point to" all formats or media expected in communications from users. It will be understood that inter-format and/or inter-medium conversion "on the fly" is feasible.

For example, one format in which media objects 280 will advantageously store information in all transactions is ASCII text. In comparison to other media and formats, ASCII text occupies a small amount of storage space and consumes little communications bandwidth. Text is also readily convertible "on the fly" into many other media formats, such as into acoustic signals for a Teletype Display Device, or into pixelated images for fax or other graphics. Conversion technology, standard in the art, may be called up as a system function by instructions contained in an associated user device template's "script."

Text may also be converted to audible speech, although the robotic nature of digitized speech is not always easy to understand or even pleasant to the ear. In parallel with text, therefore, media objects 280 also advantageously include the same information stored in WAV format for any text application where an audio medium can be expected to be needed or supported. Note, however, that there are exceptional situations when text converted to digitized speech would be preferable over parallel storage in WAV format. For example, in a transaction in which a telephone user requests a street address lookup in response to a name or telephone number, it would be highly inefficient for media objects 280 to store numerous audible records of street addresses in WAV format. In this transaction, it would be more appropriate for a "script" to point to a media object containing street addresses stored in text format, and then convert "on the fly" to digitized speech audible to the user.

Media objects 280 may also store image information in one or more formats known in the art, such as GIF or JPG. Since conversion technology between individual image formats "on the fly" is well known in the art, images need not be stored in all formats. Images may also be advantageously stored in a parallel fax image format, however, for use in transactions where faxes are frequently expected to be requested.

It will be further appreciated that media objects 280 containing music information may be stored in WAV and/or MIDI formats. If only one is to be chosen, MIDI is preferable because it consumes considerably less data storage and communication bandwidth than WAV. Again, technology to convert "on the fly" from MIDI to WAV is also well known in the art.

From the foregoing description, it will be further apparent to those in this art that the transaction model of present invention may advantageously be embodied by software executable on a general purpose computer having a central processing unit, such as CPU 50, a memory, and one or more mass storage devices (including mass storage device 72).

Further, although the foregoing description has described the present invention with respect to a single user exchanging information with the system according to a particular information structure, it will be understood that within the scope of the present invention, multiple users may communicate concurrently with the same information within the same transaction model, depending on the ability of the system to operate in a multi-task environment.

Although the present invention and its advantages have been described in detail, it should be understood that various changes, substitutions and alterations can be made herein without departing from the spirit and scope of the invention as defined by the appended claims.

I claim:

1. A method for enabling an exchange of information between a population of users and a common user device-independent system, each of said users communicating with the system through a remote user device, each user device having specific communication formats and media with which it is compatible and selected from among a plurality thereof characterized by a diversity among said specific communication formats and media, multiple users further disposed to exchange information concurrently with the system through user devices compatible with different specific communication formats and media, the method comprising the steps of:

establishing a regime of user device-independent information transactions, the regime disposed to allow the user to exchange information with the system in a series of said transactions;

creating a plurality of transaction templates, each of said transactions represented by a corresponding transaction template having a common structure, said information exchange in each of said transactions defined in user device-independent form and enabled by said corresponding transaction template;

for each user device, recognizing communication formats and media with which the user device is compatible;

responsive to said recognizing step, associating at least one corresponding user device template with each transaction template, wherein said associated user device templates are disposed, for each transaction template associated therewith, to (1) script said information exchange enabled by said associated transaction template to take place in formats and media compatible with the user device, (2) condition output from the system to be delivered to the user in formats and media compatible with the user device, and (3) condition the system to expect input from the user in formats and media in which the user device communicates; and executing a series of said transaction templates.

2. The method of claim 1, further comprising the step of interspersing at least one system function between selected ones of the transaction templates, said system functions disposed to process user device-independent information after one transaction template has terminated and before the next transaction template is executed.

3. The method of claim 2, in which said system functions include at least one system function selected from the group consisting of:

(a) identifying a further transaction template responsive to user input, and executing said further transaction template;

(b) calculating output from the system based, in part, on user input;

(c) preparing output from the system based, in part, on information retrieved from a mass storage device; and (d) writing information to a mass storage device based, in part, on user input.

4. The method of claim 1, in which selected ones of the transaction templates process user device-independent input variables in enabling said information exchange in the transactions represented thereby.

5. The method of claim 1, in which selected ones of the transaction templates create user device-independent output variables as a result of enabling said information exchange in the transactions represented thereby.

6. The method of claim 5, in which said output variables include a terminator, and in which said executing step further includes the substeps of:

terminating execution of a pending transaction template upon recognition of said terminator; and taking further action according to said recognized terminator.

7. The method of claim 6, in which said further action includes executing a further transaction template.

8. The method of claim 6, in which said further action includes enabling a system function.

9. The method of claim 6, in which said terminator is a system-generated terminator operable upon the elapse of a preselected time period without receipt by the system of user input.

10. The method of claim 9, in which said system-generated terminator enables an action selected from the group consisting of:

(a) terminating execution of said pending transaction template; and (b) prompting the user.

11. The method of claim 1, in which said user device templates execute media object files in scripting said information exchange, access to selected ones of said media object files shared by a plurality of user device templates.

12. The method of claim 1, in which association with selected ones of said user device templates is shared by a plurality of transaction templates.

13. A user device-independent transaction model for use to enable an information exchange between a population of users and a common user device-independent system, each of said users communicating with the system through a remote user device, each user device having specific communication formats and media with which it is compatible and selected from among a plurality thereof characterized by a diversity among said specific communication formats and media, multiple users further disposed to exchange information concurrently with the system through user devices compatible with different specific communication formats and media, the transaction model comprising:

a plurality of information transactions between the system and a user, the user communicating with the system through a user device, each of said transactions disposed to allow an information exchange between the user device and the system;

each of said transactions represented by a corresponding transaction template having a common structure, each of said transaction templates, when executed, enabling in user device-independent form the information exchange in the transaction represented thereby; and a plurality of user device templates, at least one user device template selectively associated with each transaction template responsive to prior recognition of communication formats and media with which the user device is compatible, each user device template disposed, for each transaction template associated therewith, to condition said user device-independent information exchange enabled by the transaction template to be format-compatible and media-compatible with the user device.

14. The transaction model of claim 13, further comprising one or more system functions interspersed between selected ones of the transaction templates, each system function disposed to process user device-independent information after execution of one transaction template has terminated and before execution of a further transaction template commences.

15. The transaction model of claim 14, in which said system functions perform at least one function selected from the group consisting of:

(a) identifying a further transaction template responsive to user input and executing said further transaction template;

(b) performing calculations;

(c) retrieving information from a mass storage device; and (d) writing information to a mass storage device.

16. The transaction model of claim 13, in which selected ones of the transaction templates process user device-independent input variables in enabling the information exchange in the transactions represented thereby.

17. The transaction model of claim 13, in which selected ones of the transaction templates create user device-independent output variables as a result of enabling the information exchange in the transactions represented thereby.

18. The transaction model of claim 17, in which said output variables include a terminator, the system disposed, upon recognition of said terminator, to terminate execution of a pending transaction template and take further action according to said recognized terminator.

19. The transaction model of claim 18, in which said further action includes executing a further transaction template.

20. The transaction model of claim 18, in which said further action includes enabling a system function.

21. The transaction model of claim 18, in which said terminator is a system-generated terminator operable upon the elapse of a preselected time period without receipt by the system of user input.

22. The transaction model of claim 21, in which said system-generated terminator enables an action selected from the group consisting of:

(a) terminating execution of said pending transaction template; and (b) prompting the user.

23. The transaction model of claim 13, in which said user device templates execute media object files in conditioning said information exchange to be format-compatible and media-compatible with the user device, access to selected ones of said media object files shared by a plurality of user device templates.

24. The transaction model of claim 13, in which association with selected ones of said user device templates is shared by a plurality of transaction templates.

25. A user device-independent transaction model for use to enable an information exchange between a population of users and a common user device-independent system, each of said users communicating with the system through a remote user device, each user device having specific communication formats and media with which it is compatible and selected from among a plurality thereof characterized by a diversity among said specific communication formats and media, multiple users further disposed to exchange information concurrently with the system through user devices compatible with different specific communication formats and media, the transaction model comprising:

a plurality of information transactions between the system and a selected user device, each of said transactions disposed to allow an information exchange between the user device and the system;

each of said transactions represented by a corresponding transaction template having a common structure, each of said transaction templates, when executed, enabling in user device-independent form the information exchange in the transaction represented thereby, first selected ones of the transaction templates processing user device-independent input variables in enabling the information exchange in the transactions represented thereby, second selected ones of the transaction templates also creating user device-independent output variables as a result of enabling the information exchange in the transactions represented thereby;

said output variables including a terminator, the system disposed, upon recognition of said terminator, to terminate execution of a pending transaction template in accordance therewith;

a plurality of user device templates, at least one user device template selectively and robotically associated with each transaction template responsive to prior robotic recognition of communication formats and media with which said user device is compatible, each user device template disposed, for each transaction template associated therewith, to condition said user device-independent information exchange enabled by the transaction template to be format-compatible and media-compatible with said user device;

a plurality of media object files, said user device templates further disposed to execute ones of said media object files in conditioning said information exchange to be format-compatible and media-compatible with said user device, access to selected ones of said media object files shared by a plurality of user device templates;

one or more system functions interspersed between selected ones of the transaction templates, each system function disposed to process user device-independent information after execution of one transaction template has terminated and before execution of a further transaction template commences, said system functions including at least one system function selected from the group consisting of:

(a) testing said output variables for a user selection and responsive to said testing, executing a corresponding transaction template;

(b) performing calculations;

(c) retrieving information from a mass storage device; and (d) writing information to a mass storage device.

26. A user device-independent transaction model for use to enable an information exchange between a population of users and a common user device-independent system, each of said users communicating with the system through a remote user device, each user device having specific communication formats and media with which it is compatible and selected from among a plurality thereof characterized by a diversity among said specific communication formats and media, multiple users further disposed to exchange information concurrently with the system through user devices compatible with different specific communication formats and media, the transaction model comprising:

means having a common structure for executing a series of information transactions between the system and selected ones of said user devices, said information transactions in user device-independent form; and means, operable during the execution of each of said transactions, for enabling a plurality of user devices to interface concurrently with said information transactions, said interfacing in user device-specific form.

27. A user device-independent transaction model for use to enable an information exchange between a population of users and a common user device-independent system, each of said users communicating with the system through a remote user device, each user device having specific communication formats and media with which it is compatible and selected from among a plurality thereof characterized by a diversity among said specific communication formats and media, multiple users further disposed to exchange information concurrently with the system through user devices compatible with different specific communication formats and media, the transaction model comprising:

a transaction template having a common structure, the transaction template disposed, upon execution thereof, to process information in user device-independent format;

the transaction template further disposed, upon execution thereof, to receive input variables from a selected user device in user device-independent format;

a user device template selectively associated with the transaction template according to prior recognition of communication formats and media with which the user device is compatible, the user device template ordaining a predefined user device-dependent scene and a predefined user device-dependent script for the transaction template to follow in execution thereof;

the transaction template further disposed, upon execution thereof, to selectively play one or more input variables as system output to the user device according to said scene and said script;

the transaction template further disposed, upon execution thereof, to selectively receive user input from the user device according to said scene and said script;

the user device template disposed to condition said system to play system output and to recognize user input in said formats and said media with which the user device is compatible;

the transaction template further disposed, upon execution thereof and in combination with said user input, to generate output variables according to said scene and said script; and the transaction template further disposed, upon execution thereof, to terminate upon recognition of a terminator among said output variables.

28. The transaction model of claim 27, further comprising one or more system functions, the system disposed to enable ones of the system functions according to values of output variables.

29. The transaction model of claim 28, in which said system functions include at least one system function selected from the group consisting of:

(a) testing values of output variables and, responsive to identified ones of said values, executing corresponding transaction templates;

(b) calculating system output based, in part, on user input; and (c) preparing system output based, in part, on information retrieved from a mass storage device.

30. The transaction model of claim 27, in which the terminator is precipitated by user input.

31. The transaction model of claim 27, in which the terminator is generated by the system according to predetermined criterion.

32. The transaction model of claim 31, in which the predetermined criterion is selected from the group consisting of:
   (a) elapse of a preselected period of time; and
   (b) occurrence of an event in said script.

33. The transaction model of claim 27, in which a plurality of said transaction templates cooperate in a predefined regime thereof.

34. The transaction model of claim 33, in which output variables of one transaction template are selectively received by other transaction templates as input variables.

35. The transaction model of claim 33, in which the terminator recognized in the execution of one transaction determines the identity of next transaction to be executed.

36. A computer program product having a computer readable medium on which computer readable logic is recorded for building a user device-independent transaction model in which information may be exchanged between a population of users and a common user device-independent system, each of said users communicating with the system through a remote user device, each user device having specific communication formats and media with which it is compatible and selected from among a plurality thereof characterized by a diversity among said specific communication formats and media, multiple users further disposed to exchange information concurrently with the system through user devices compatible with different specific communication formats and media, the system including a processor and a memory and a mass storage device, the computer program product comprising:
   a plurality of transaction templates having a common structure, each of said transaction templates disposed, upon execution thereof, to process information in user device-independent format, each of said transaction templates including:
      means for receiving input variables at said transaction templates from a selected user device in user device-independent format;
      means for selectively playing one or more input variables as system output to the user device according to a predefined scene and a predefined script;
      means for selectively receiving user input from the user device according to said scene and said script;
      means, in combination with user input, for generating output variables according to said script;
      means for recognizing a terminator among said output variables; and
      means, responsive to said means for recognizing, for terminating said transaction template;
   means for identifying communication formats and media with which the user device is compatible; and
   a plurality of user device templates selectively associated with each transaction template responsive to said means for identifying said associated user device template disposed to condition said scene and said script to play system output and recognize user input in said identified formats and said identified media.

37. The computer program product of claim 36, further comprising means for enabling system functions according to corresponding values of said output variables.

38. The computer program product of claim 36, further comprising means for creating a terminator according to a predetermined criterion.

39. The computer program product of claim 38, in which the predetermined criterion is selected from the group consisting of:
   (a) elapse of a preselected period of time; and
   (b) occurrence of an event in said script.

40. The computer program product of claim 36, further comprising means for executing said plurality of said transaction templates in sequence.

41. The computer program product of claim 40, further comprising means for selectively receiving output variables generated by one transaction template as input variables for subsequent transaction templates.

42. The computer program product of claim 40, further comprising means, responsive to said means for recognizing a terminator, for determining the identity of subsequent transactions to be executed.

* * * * *